Feb. 28, 1933.                    H. WILLIS                    1,899,545
WIPER FOR WINDSCREENS OF MOTOR VEHICLES AND FOR LIKE PURPOSES
                        Filed Nov. 28, 1931
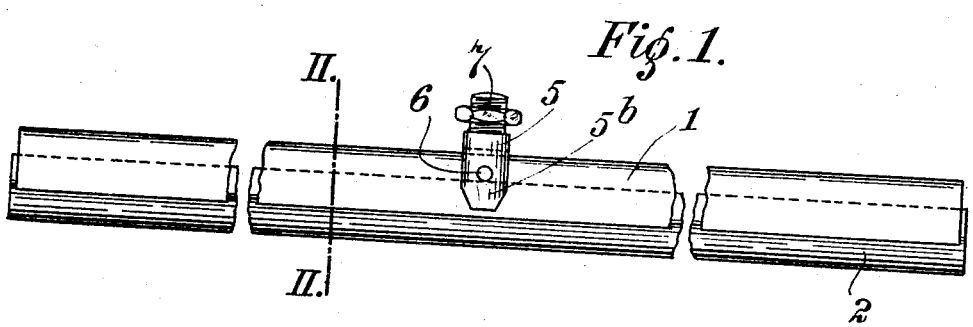
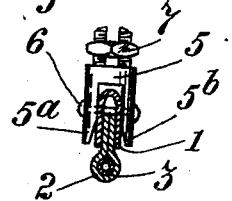 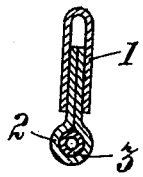 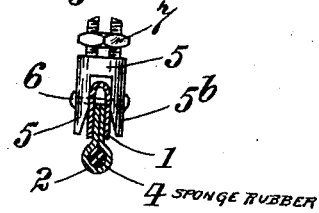
Harry Willis INVENTOR.
per N. D. ........
                    ATTORNEY Patented Feb. 28, 1933

1,899,545

UNITED STATES PATENT OFFICE

HARRY WILLIS, OF BANGOR, NORTHERN IRELAND, ASSIGNOR TO WILLIS WIPER CO., LIMITED, OF BELFAST, NORTHERN IRELAND

WIPER FOR WINDSCREENS OF MOTOR VEHICLES AND FOR LIKE PURPOSES

Application filed November 28, 1931, Serial No. 577,744, and in Great Britain February 5, 1931.

This invention relates to wipers of the kind used for wiping the windscreens of motor vehicles and the like, its object being to provide improvements therein.

According to this invention the wiping medium is provided with a resilient and more effective wiping edge, for example, a strip of chamois leather, or other material is formed with a looped edge and has an insert or beading of resilient material, for example, the chamois leather or other wiping medium may be lapped round a length of rubber tubing, or resilient strip, or bar of rubber or sponge rubber, the edges of the strip of chamois leather or equivalent being left of sufficient length to be gripped by the metal or other holder in known manner. As an example of a suitable insert or beading for the wiping edge of the wiper blade 1 may use rubber tubing similar to that used for cycle valves.

Preferably the holder for the resilient wiping medium is provided with a connecting device (for attachment to the usual operating lever) which is characterized by a fork and pin connection which permits a certain amount of play, or roll of the blade from side to side relatively to its axis and, preferably, also permits movement of the blade in the plane of its axis. The free rolling effect may be obtained by outwardly tapering the inner sides of the fork connecting the blade with the operating lever.

The invention will now be described, by way of example, with reference to the accompanying drawing:—

Fig. 1 is a side view of a wiper blade provided with a resilient wiping edge in accordance with this invention.

Fig. 2 is a cross sectional view on the line II—II, Fig. 1, Fig. 2ª being a corresponding enlarged detail.

Fig. 3 is a cross sectional view corresponding to Fig. 2, of a modification of the construction of the resilient edge of the wiper blade.

Referring to the drawing:—

In the example shown at Figs. 1 and 2, the wiper holder 1 is formed of a piece of folded metal and is adapted to grip the two edges of a strip 2 of chamois leather which is lapped round a piece of rubber tubing 3, or as in Fig. 3, lapped round a bar of sponge rubber 4. The blade 1, with resilient wiping edge, as described, is provided with a connector, or connecting device, comprising a forked member 5, the jaws 5ª and 5ᵇ of which embrace the blade 1 to which they are connected by a pin 6. A slotted screw and nut arrangement 7 is shown provided for attaching the connecting device to the usual operating lever (not shown). The outer ends of the arms of the jaws 5ª and 5ᵇ are tapered outwardly, as shown clearly at Figs. 2 and 3 for the purpose of allowing a certain amount of play or roll of the blade from side to side relatively to its axis. The pin connection 6 also allows movement of the blade 1 in the plane of its axis. This freedom in the connecting means between the blade and its operating lever ensures more efficient wiping of the glass surface to be kept clean.

A wiper constructed as described, and particularly a wiper which comprises a tubular or other resilient medium encased in chamois leather or equivalent soft and efficient glass wiping material, gives a more efficient and clean wiping action. The wiping blade with this combination has also the further advantage that it can readily be cleaned by washing when required.

I claim:—

1. A windscreen wiper blade comprising, a rigid holder of U-cross section, a folded strip of pliable leather having its edges clamped in said holder, and a tubular rubber member inside the fold of said strip forming a wiping edge thereon of enlarged circular cross-section.

2. A wind screen wiper blade comprising, a rigid holder of U-cross section, a folded strip of pliable leather having its edges clamped in said holder, and a cylindrical, rubber filling member inside the fold of said strip forming a wiping edge thereon of enlarged, circular cross section.

3. A wind screen wiper blade comprising, a rigid holder of U-cross section, a folded strip of pliable material having its edges clamped in said holder, and a resilient, absorbent filling member of cylindrical form inside the fold of said strip forming a wiping edge thereon of enlarged, bulbous cross section.

In testimony whereof I affix my signature.

HARRY WILLIS.